Dec. 15, 1964   O. P. MOLT   3,161,408
COMPRESSION SPRINGS FOR MATTRESSES, UPHOLSTERED
FURNITURE, AND THE LIKE
Filed Jan. 29, 1963
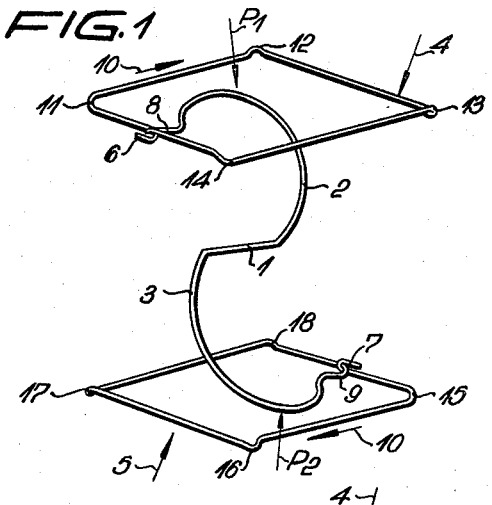
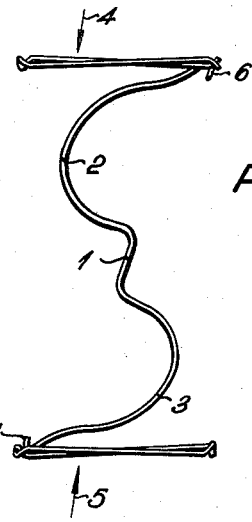
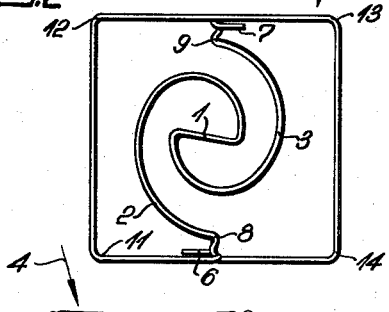
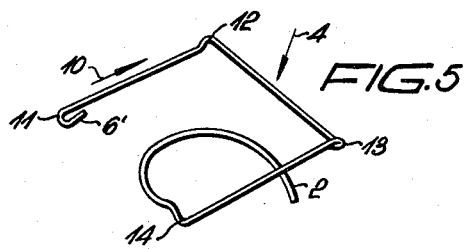
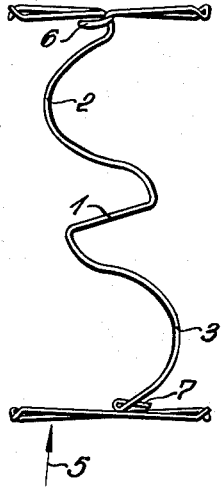
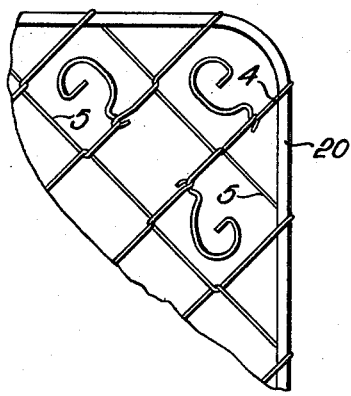
INVENTOR
OTTO P. MOLT
by Michael S. Striker
Attorney

United States Patent Office

3,161,408
Patented Dec. 15, 1964

3,161,408
COMPRESSION SPRINGS FOR MATTRESSES, UP-
HOLSTERED FURNITURE, AND THE LIKE
Otto P. Molt, Schorndorfer Strasse, Haubersbronn,
Wurttemberg, Germany
Filed Jan. 29, 1963, Ser. No. 254,665
Claims priority, application Germany, Feb. 13, 1962,
M 51,791
7 Claims. (Cl. 267—1)

The present invention relates to compression springs for spring sets for mattresses, upholstered furniture, and the like of a cylindrical, conical, or double-conical coil shape, and it is an object of the invention to provide such springs with dead end turns of a polygonal and preferably square shape and in each spring in vertical alignment with each other, and to design these dead ends so that at least the corner portions thereof project laterally over the intermediate spring turns, while the free ends of these dead ends are bent over to form eye-shaped hooks.

The springs according to the invention have the advantage that the laterally projecting corners of the dead ends of adjacent springs may be easily connected to each other without additional connecting means to form a spring set with a uniform spring distribution, and that these springs may also be easily secured to the frame of the set simply by hooking the corner portions of the dead ends on the frame.

Although springs of a polygonal shape, as seen in a plan view, are known, in which all turns of the spring have the same dimensions, it is new to provide a spring in which only the dead end turns have a polygonal shape and at least the corner parts thereof project on all sides over the intermediate spring turns sometimes referred to herein as the intermediate portion. Only if the polygonal springs are made of such a construction, it is possible to hook them directly together at the corners of their dead end turns.

The free end of each dead end turn which is provided with a connecting hook may be provided at one corner of the polygon. In this case, the end turn is left open between the respective corner and the point where the next turn of the spring branches off the end turn. The hook is used for connecting the spring to the corner of a dead end of an adjacent spring.

Preferably, however, each dead end turn is adapted to be opened and closed at one side of the polygon where the wire branches off into the next turn, i.e. where an end of the intermediate portion is connected to the end turn, by a hook on the free end of the dead end turn which may be hooked into an end of the intermediate portion at the mentioned point. Although coil springs with closed end turns are known as such, the free ends of these end turns are always irremovably connected. By connecting the free end of each end turn so as to be detachable it is possible to open the end turn when the spring is to be hooked into the corners of the end turns of the adjacent springs, whereupon it may again be closed. The solidity of these springs with closed dead end turns is not impaired by the fact that these end turns may also be opened.

Furthermore, all of the corners of both dead ends of each spring are preferably bent in the same direction either inwardly or outwardly from the middle of the spring for a distance at least equal to the thickness of the wire. The end turns of adjacent springs can thus be hooked together within the supporting plane at any corners thereof without tension, and there will be very little friction produced between the connected corners and thus also very little noise when the spring set is being compressed.

Another feature of the invention consists in designing the compression spring in the form of a double-conical coil spring, a so-called waisted spring, which converges toward the middle and coils from a straight central wire portion in opposite directions toward its two ends.

The particular advantage of a spring of this shape is that its resistance to compression considerably increases the more it is being compressed. After the spring at first yields easily, the straight central wire portion which connects the two oppositely wound spring sections then functions as a torison rod through which the degree of hardness of the spring when further compressed increases to a considerably greater extent than occurs in a spring of the conventional type in which the central narrower turns are wound continuously in the same direction. As the result of this it is possible to build spring sets of a low height with a high elasticity and thus to save in weight and material.

The various features and advantages of the present invention will become more clearly apparent from the following detailed description thereof which is to be read with reference to the accompanying drawings, in which—

FIGURE 1 shows a perspective view of a compression spring according to the invention;

FIGURE 2 shows a plan view of the same spring;

FIGURES 3 and 4 show two side views of the spring as seen at an angle of 90° to each other;

FIGURE 5 shows a perspective view of a spring end according to a modification of the invention; while FIGURE 6 shows a plan view of a corner section of a spring set with springs hooked into each other at the corners of their end turns.

In FIGURES 1 to 4 of the drawings, the invention is illustrated in the form of a double-conical coil spring, a so-called waisted spring, which converges toward the center and in which each of the two conically flared turns 2 and 3 starts from a straight central wire portion 1 which is bent in the opposite direction and thus extends at an oblique angle to the axis of the spring. When the spring is being compressed in the axial direction, as indicated by the arrows $P_1$ and $P_2$ in FIGURE 1, this straight central portion 1 will be subjected to torsion. Although a coil spring of this particular shape constitutes a preferred embodiment of the invention, its principles may also be applied to a double-conical spring which is wound in only one direction or even to a cylindrical spring.

The two dead end turns 4 and 5 of the spring which are made in the conventional manner without pitch in order to attain proper supporting surfaces which extend vertically to the spring axis have a polygonal shape and are disposed above and in alignment with each other. They are made of such a size that at least their corner parts project laterally over the intermediate turns 2 and 3. Although in FIGURES 1 to 4 these end turns 4 and 5 have a square shape, they could also have a triangular or hexagonal shape. The free end of each of these end turns is bent backward to form a hook 6 or 7 which in the spring according to FIGURES 1 to 4 is hooked to the respective end of the intermediate portion at the side of the square which branches off into the turn 2 or 3 of the spring and may again be unhooked therefrom. The two end turns of the spring may therefore be closed.

In the modification of the spring as shown in FIGURE 5, the free end of each end turn 4 and 5 which is provided with a hook 6' is disposed at one corner of the square and each of these end turns is open between the hook-shaped end and the point 14 where the end turn branches off into the turn 2 of the spring.

Each corner part 11, 12, 13, 14 and 15, 16, 17, 18 of the two end turns 4 and 5 is bent upwardly or downwardly, respectively, from the preceding side of the end turn, as seen in the direction of the respective arrow 10, and at least for a distance equal to the thickness of the wire.

When a spring unit is being assembled, the individual springs are hooked into each other at the corners of their end turns 4 and 5, as illustrated in FIGURE 6. The adjacent springs are then preferably arranged so as to turn in opposite directions so that, for example, the end turn 4 of one spring and the end turn 5 of the adjacent spring face upwardly. Since the corner parts are bent upwardly or downwardly, respectively, the interconnected end windings at each side are held without tension within the same plane and produce only a low friction at their points of connection. Those corners of the end turns which are adjacent to the sides of the frame 20 of the spring set may be hooked over the latter similarly as the other corners of the adjacent spring ends are hooked into each other. The upwardly or downwardly bent corner portions which are hooked over the sides of frame 20 also insure at these points a proper connection without tension.

For hooking the adjacent springs according to FIGURES 1 to 4 into each other at the corners of their end turns, it is necssary to open the hooks 6 and 7 so that the end turns of the adjacent springs may be inserted through the opened sides which thereafter are again closed by hooks 6 and 7.

If the end turns of the springs are, however, designed as shown in FIGURE 5, hook 6' of each end turn of one spring is hooked into the bent corner of the end turn of an adjacent spring.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A compression coil spring for spring sets for upholstered furniture, mattresses and the like having opposite dead end turns of a polygonal shape above and in alignment with each other, at least the corner parts of said dead end turns projecting laterally over the intermediate turns of the spring, all of said corner parts being offset in the same direction relative to the middle of the spring for a distance equal to at least the thickness of the spring wire and the free ends of said end turns being bent backward to form connecting hooks.

2. A compression coil spring, comprising two spaced polygonal end turns and an intermediate portion extending between said end turns, said end turns being aligned with each other and each thereof having corner parts extending laterally beyond said intermediate portion, all of said corner parts of each end turn being offset in the same direction relative to the middle of the spring for a distance equal to at least the thickness of the spring wire, and each end turn further comprising a hook provided between two adjacent corners thereof, said intermediate portion having two ends each connected with one of said hooks, and a substantially straight central portion located midway between said end turns, the remaining parts of said spring extending from said central portion being convoluted in opposite directions.

3. A compression coil spring as set forth in claim 2, wherein each of said end turns has a free end and said free ends are bent backward substantially over themselves to form said hooks and wherein said hooks are located on opposite sides of said central portion.

4. In a spring set for mattresses and the like, in combination, a pair of compression springs each comprising two spaced polygonal end turns and an intermediate portion between the respective end turns, each of said end turns having corner parts extending laterally beyond the respective intermediate portion and each end turn of one of said springs engaging with a corner part thereof the corner part of the corresponding end turn of the other spring and comprising a hook detachably coupled to the intermediate portion of said one spring so that, upon detachment of said hooks, the end turns of said one spring may be detached from the end turns of the other spring.

5. A spring set as set forth in claim 4, wherein said intermediate portion has two ends each for receiving one of said hooks, and a substantially straight central portion located substantially midway between said end turns, the remaining parts of said spring extending from said central portion convoluted in opposite directions.

6. A spring set as set forth in claim 4, wherein the hooks on the end turns of at least one of said springs face in the same rotational direction relative to the vertical axis of said one spring so that upon detachment of said hooks, said one spring may be rotated about its vertical axis for disengagement of said one spring from the other of said pair of springs.

7. A spring set as set forth in claim 4, wherein the end turns of said one spring are interlocked with the corresponding end turns of the other spring substantially at one corner part of each of said end turns.

References Cited in the file of this patent

UNITED STATES PATENTS

| | | |
|---|---|---|
| Re. 10,220 | Ogborn et al. | Oct. 24, 1882 |
| 554,597 | Smith | Aug. 13, 1895 |
| 1,631,056 | Pepernick | May 31, 1927 |

FOREIGN PATENTS

| | | |
|---|---|---|
| 164,930 | Great Britain | June 23, 1921 |
| 562,999 | Great Britain | July 25, 1944 |